United States Patent
Zohar et al.

(10) Patent No.: US 8,170,786 B2
(45) Date of Patent: May 1, 2012

(54) METHOD AND APPARATUS FOR DETERMINING REFERENCE POINTS FOR GROUPS OF DATA

(75) Inventors: Ron Zohar, Waldbronn (DE); Andrea Gräser, Karlsruhe (DE)

(73) Assignee: init Innovative Informatikanwedungen In Transport-, Verkehr und Leitsystemen GmbH, Karlsruhe (DE)

( * ) Notice: Subject to any disclaimer, the term of this patent is extended or adjusted under 35 U.S.C. 154(b) by 949 days.

(21) Appl. No.: 11/881,369

(22) Filed: Jul. 26, 2007

(65) Prior Publication Data

US 2008/0046180 A1 Feb. 21, 2008

(30) Foreign Application Priority Data

Aug. 16, 2006 (DE) .......................... 10 2006 038 303

(51) Int. Cl.
*G06G 7/78* (2006.01)
(52) U.S. Cl. ....................................................... 701/300
(58) Field of Classification Search ....... 701/1, 300–302
See application file for complete search history.

(56) References Cited

U.S. PATENT DOCUMENTS

| | | |
|---|---|---|
| 2004/0181554 A1 | 9/2004 | Heckerman |
| 2009/0099775 A1* | 4/2009 | Mott et al. .................... 701/300 |

FOREIGN PATENT DOCUMENTS

| | | |
|---|---|---|
| CN | 1846197 A | 10/2006 |
| JP | 2004355505 | 12/2004 |
| JP | 2006 004270 | 1/2006 |

OTHER PUBLICATIONS

S. Schroedl et al., "Mining GPS Traces for Map Refinement", Data Mining and Knowledge Discovery, 9, 59-87, 2004.
K. Wagstaff et al., "Constrained K-Means Clustering With Background Knowledge", Proceedings of the 18th Int. Conf. on Machine Learning, 2001, pp. 277/584.
K. Wagstaff et al., "Constrained K-Means Clustering With Background Knowledge", Proceedings of the Eighteenth International Conference on Machine Learning 2001, p. 577-584.
S. Schroedl, et al., "Mining GPS Traces for Map Refinement", Data Mining and Knowledge Discovery, 9, 59-87, 2004.

* cited by examiner

*Primary Examiner* — Yonel Beaulieu
(74) *Attorney, Agent, or Firm* — Klaus J. Bach (57) ABSTRACT

In a method and apparatus for the management of data, particularly coordinate data, which are determined with respect to a number of predetermined reference points with a spatial distribution around the respective reference points using at least one sensor arrangement, such as a coordinate determination arrangement, the data points are grouped into a number of classes in accordance with a first distance criterion, a respective center point of the data point classes is determined, a distance of each data point from the center points of the data point classes is compared with a second distance criterion, and the various individual data point classes are assigned to respective reference points.

16 Claims, 4 Drawing Sheets

METHOD AND APPARATUS FOR DETERMINING REFERENCE POINTS FOR GROUPS OF DATA

BACKGROUND OF THE INVENTION

The present invention resides in a method and arrangement for managing data, in particular, coordinate data which are determined with respect to a number of predetermined reference points in the form of data points with a spatial distribution around the respective reference point using at least one sensor arrangement such as a coordinate determination device and also in a computer program product comprising first program code sequences for receiving data, particularly coordinate data, which are determined, with respect to a number of reference points as data points with a spatial distribution around the respective reference points using at least one sensor arrangement such as a coordinate determination device for carrying out the method.

In many technical fields, it is difficult particularly with respect to the management of data, which are determined with a certain spatial distribution around reference points, to associate the data or, respectively, data points for evaluation purposes with respective reference point.

The invention is preferably used in connection with public mass transit systems, where today buses and trains are in communication via wireless data transmission directly with an operational control computer of a supervisory computer-controlled operating system. This supervisory computer ideally knows the locations of all vehicles, compares them with the desired locations and constantly performs a desired to actual location comparison so that, in case of malfunctions, corresponding computer-based measures for a rapid elimination of the malfunction can be performed. Objects of the computer-controlled guide system referred to above include locating the vehicles, determining and indicating the desired to actual position comparison, securing connections, providing dynamic passenger information in the vehicles and at the stops and protocolling and statistically evaluating the data. Herein the schedule and the routing network form the basis for the calculations referred to above.

The driving routes, the GPS coordinates of the stops and the travel times form the framework on which the travel schedule is based. But, in practice, the determination of those data is difficult and time consuming because of various external influences such as construction sites, detours or similar circumstances and also because of variable coordinates of the stops. Up to this date, these data are determined only manually at the various locations. To this end, for example, the various stops are visited with vehicles which are placed in service specifically for this purpose and, at each stop which represents a respective reference point for the data determination, corresponding data (coordinate data are determined). This requires additional personnel and equipment which both are quite expensive.

It is the object of the present invention to provide a method and an apparatus of the type referred to earlier but wherein the management of data (collection and evaluation) can be performed with regard to certain reference points in a simple manner. The individual data points or, respectively, groups of data points should be clearly associated with the predetermined reference positions.

SUMMARY OF THE INVENTION

In accordance with the invention, a method and an arrangement for managing data, particularly coordinate data, which are determined, with respect to a number of predetermined reference points, as data points with a spatial spread around the respective reference point using at least one sensor arrangement such as a coordinate determination arrangement, using the steps of:
  a) grouping the data points into a number of data point classes in accordance with a first spacing criterion,
  b) determining a respective center-point of the data point classes;
  c) comparing a distance of each data point from the center-points of the data point classes with a second distance criterion,
  d) depending on the comparison in step c):
  d1) selecting a data point as starting point for an additional data point class;
  d2) re-grouping the data points in the existing data point classes and the additional data classes in accordance with the first distance criterion
  d3) Repeating the steps b) to d2) until a pre-determined termination criterion is fulfilled,
  e) assigning the various data point classes to a respective reference point.

In accordance with the invention, an arrangement for managing data, particularly coordinate data with at least one sensor arrangement which is movable at least in the vicinity of predetermined reference points, such as a coordinate determination arrangement for determining data points with respect to the predetermined reference points, is characterized by a data processing arrangement, in which the data points of the sensor arrangement can be entered and which includes means for performing the inventive method for the management of data.

Further in accordance with the invention, a computer program product which comprises first program code sequences for inputting data, particularly coordinate data which are determined with respect to a number of predetermined reference points as data points with a spatial distribution around the respective reference point using at least one sensor arrangement such as a coordinate determining arrangement into data processing equipment, is characterized by second program code sequences for performing the additional data processing steps of an embodiment according to the inventive method.

A basic concept of the present invention is the establishment of a novel method for managing data, particularly coordinate data which are collected during a continuous operation of a setup including, in an abstract consideration, a public transportation system with vehicles, network and operation control system, with the purpose of evaluating the data subsequently in spite of operation-caused variations safely and as unambiguously as possible with respect to an assignment to certain predetermined reference points such as desired stops.

For a highly efficient data evaluation in accordance with a particular embodiment of the inventive method, it is provided that in step a) a number of data points is selected and that, subsequently, the remaining data points are assigned in classes, each to the closest selected data point.

In this connection, in a further embodiment of the method according to the invention, it may be provided that in step a) as start-out point for a particular class any first data point and a second data point, which has a maximum distance from the first data point, are selected.

In order to be able to influence the grouping of the data points directly depending on praxis-relevant parameters, particularly with respect to the positions of the reference points, in another embodiment of the method according to the invention, it is provided that the second distance criterion as given in step c) is dependent on a minimal distance between the individual reference points. In this way, in step c) such data points could be determined which have from the center point of the respective data point class a distance which is greater than half the distance between two reference points which are closest together. The second distance criterion however could also correspond to the first distance criterion.

In order to achieve, based on a quasi-freely selectable initializing grouping of the data points, by iteration, a more and more accurate grouping of the data, in another embodiment of the method according to the invention, in step d1) that data point is selected whose smallest distance from a center point as selected in step c) with respect to all the considered data points is maximal.

In a re-application of the first distance criterion, it may further be provided that in step d2) the data points are assigned to that data point class or further data point classes, from whose center-points or, respectively, start-out points they have the shortest distance.

In order to make a highly accurate coordination of the data points or, respectively, data point classes with the respective reference points possible, it is, in accordance with the invention furthermore provided that the step d3) is performed until all distances determined in step (c) are smaller or equal to a predetermined value which, advantageously, corresponds to half the minimal distance between individual reference points.

Particularly in connection with closely adjacent reference points, it may, under certain circumstances, be difficult, to clearly assign individual data points alone on the basis of coordinate information to a reference point. In a preferred use of the present invention in the field of a public transportation system, this case occurs particularly if two reference points (stops) are disposed opposite each other in a narrow street.

In order to make a successful data management possible also in such a case, in a further embodiment of the method according to the invention, each data point includes a direction information concerning the orientation of the movement of the sensor arrangements in connection with the data point determination and the distances and/or center-points are determined by weighting spatial coordinate differences between data points with relative orientations.

In a corresponding further embodiment according to the invention, the sensor arrangement is designed so as to be capable of providing in the data point determination directional information concerning an orientation of the movement of sensor arrangement.

Preferably, the orientation that is the directional information is determined for each data point in such a way that, within a predetermined time window, a number of auxiliary data points are determined for each data point, particularly in the form of repeated cyclic sensor interrogations, so that the orientation or direction of movement of the sensor arrangement can easily be determined by corresponding differentiation of subsequent data determined in the interim.

In another embodiment of the method according to the invention, the weighting is stronger the closer the data points are disposed spatially adjacent one another, whereas, with spatially more distant data points—which, likely, do not belong to a common data point class anyway—the relative orientation is practically unimportant.

Like in the spatial distribution criterion referred to earlier for ensuring, that no data points within a common data point class have excessive distances from one another, in connection with another embodiment of the method according to the invention only data points with a relative orientation within a predetermined tolerance range are assigned to a common data point class.

In order to avoid increased personnel and material expenses in determining the data points, in a preferred embodiment of the apparatus according to the invention, the sensor arrangement is assigned to an object with an application purpose which is different from the data point determination, in particular to a passenger transport vehicle of the public passenger transport system and is moved thereby.

Furthermore, the sensor arrangement for the data point determination may be dependent on at least one predetermined change of the state of the object.

With the use of the present invention in connection with passenger transport systems, a first data point determination may be performed for example when the driver opens a door at, or near, a stop. In accordance therewith, the at least one sensor arrangement which is movable with the vehicle, is coupled with the door opening mechanism of the vehicle in such a way, that with each door opening procedure a data point is recorded by the sensor arrangement.

If a plurality of sensor arrangements are used in connection with the present invention, it is not necessary that each sensor arrangement determines a data point with respect to each reference point. Rather, with the majority of the sensor arrangements used, a complete data coverage is obtained during normal operation. In connection with the passenger transportation of the public transport system with the system according to the invention in use, the drivers are not "forced" to open the door at each stop (reference point) because as a result of the multitude of vehicles used, on average at least one data point is available at each reference point. To achieve this, occasionally simply the observation period must be correspondingly extended.

In accordance with the invention, no additional data processing occurs in the sensor arrangement in this connection or, respectively, the assignment object but the whole data processing is performed in the data processing arrangement of the apparatus according to the invention referred to earlier.

Further features and advantages of the present invention are apparent from the following description of particular embodiments on the basis of the drawings.

BRIEF DESCRIPTION OF THE DRAWINGS

It is shown in.

DESCRIPTION OF PREFERRED EMBODIMENTS

Figure 1A:
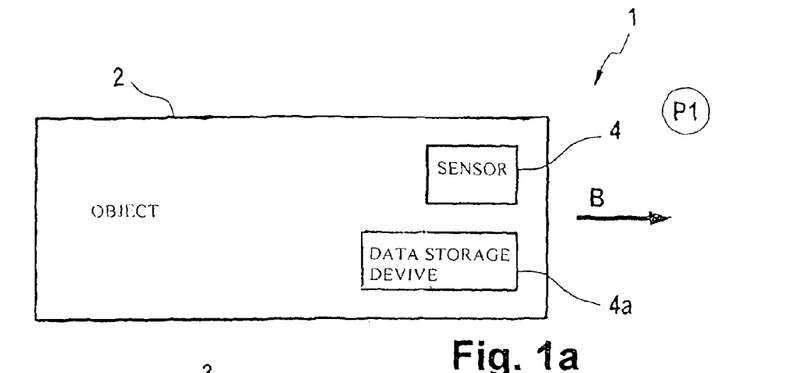
FIG. 1 a schematic representation of an apparatus according to the invention for managing data.
Figure 1B:
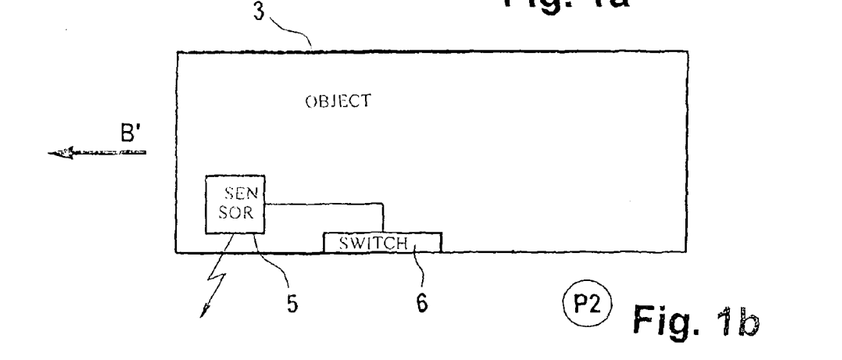
Figure 1C:
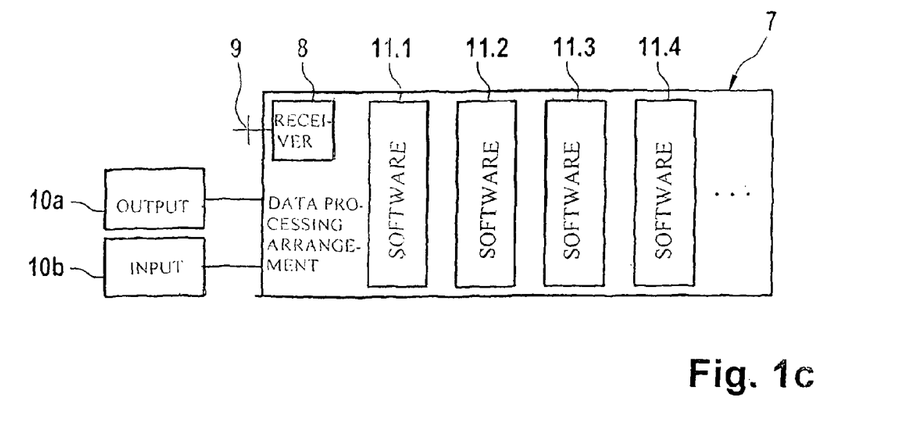

FIG. 1 shows the movement B, B' of the objects 2, 3 or, respectively, the sensor devices 4, 5 with respect to predetermined reference points P1, P2 of which only two are shown for reason of clarity. In other words: The objects 2, 3 are moved with their sensor devices 4, 5 in the proximity of the predetermined reference points P1, or, respectively, P2 and past these points, whereby at least in the proximity of a reference point P1, P2 corresponding data points are determined by the sensor devices 4, 5 with regard to the respective predetermined reference points P1, P2. Depending on the application, the data points determined in this way may be simple (GPS)-coordinate data (like for applications in the field of public passenger transportation systems) or quasi-type values with an additional location information such as temperature, pressure or radiation measurement values.

The predetermined reference points P1, P2 represent—depending on the application—selected measurement locations. In the case of the preferred application of the present invention in the field of public transportation systems, the reference points P1, P2 can be identified specifically with the desired positions of stops.

The sensor devices 4, 5 are designed preferably for the routine-determination of data points during so-called cyclical events that is at predetermined time intervals. Data points determined in this way will subsequently be called "cyclic data points". In addition, during a movement past an object 2, 3 or, respectively, the respective sensor device 4, 5 in the proximity of a reference point P1, P2, a particular data point is preferably accurately determined which, below, will be called simply "data point".

In the preferred embodiment of the apparatus according to the invention 1, the determination of these data points occurs together with a predetermined change of state of the respective object 2, 3. This is shown herein figuratively on the basis of the object 3. In the movable object 3, the sensor device 5 is connected to an operating mechanism 6 assigned to the object 3. As a result, in addition to the cyclic determination of data points described above, a data point determination with regard to a predetermined reference point P1, P2 can additionally be initiated in a dedicated manner via a change of state particularly of the operating mechanism 6.

Basically, the operating mechanism 6 may be of any type such as a switch actuated automatically or by an operator. In connection with the preferred use of the present invention in the field of local mass transportation systems the operating mechanism 6 may specifically be a vehicle door, so that a data point is determined by the sensor arrangement 5 whenever a door of the object 3 (vehicle, bus) is opened at or near a reference point (stop) which represents a vehicle stop and which, in accordance with the invention, concurs with a determination of the actual location of the respective stop.

Particularly if a plurality of objects 2, 3 are employed for the data point determination, it is in accordance with the invention not necessary that each object performs such a data point determination with regard to each reference point. In order to generate a complete data point set with at least one data point per reference point for each reference point, only one of the objects used needs to determine a data point.

In this way, the arrangement according to the invention generates data, particularly coordinate data, with respect to a number of reference points in the form of data points with a certain spatial distribution around the respective reference point. The spatial distribution mentioned is established in addition to unavoidable determination errors (measurement errors) of the sensor arrangements used, particularly as a result of unavoidable deviations in practical use of the arrangement according to the invention: for example, stops of the transport vehicle may be blocked by parking cars or displaced because of construction activities; operating means of machines cannot advance to the predetermined operating position because of mechanical resistances; rope-restrained automated research devices for measuring the salt content depending on the sea water depth are carried off by water currents, for example.

The apparatus 1 according to the invention is therefore designed in this connection, in a way described later, so as to facilitate management of the data recorded, such that each of the individual data points or, respectively, a group or classes formed by a number of individual data points can be assigned to a respective reference point. In other words: the present invention facilitates a coordination of certain actual measurements with a respective desired reference point.

To this end, the arrangement 1 according to the invention includes, in addition to the objects 2, 3 already described in detail, a data processing arrangement 7 designed for receiving the predetermined data points of the objects 2, 3 or, respectively of the sensor arrangements 4, 5. Consequently, the data processing arrangement 7 includes first a suitable receiving means 8 with a connecting point 9 adapted to the type of the data transmission of the objects 2, 3 or, respectively, the sensor devices 4, 5. Furthermore, input means 10a, such as a keyboard, a (magneto-) optical mechanism or a network connection as well as an output means 10b, for example, an image screen etc. are provided.

In accordance with FIG. 1, a wireless transmission of data from a sensor arrangement 5 to the data processing device 7 may be provided for, so that the connecting point 9 may suitably be provided in the form of an air connecting point/antenna device.

Additionally, or alternatively, in accordance with the embodiment of FIG. 1, the data generated by a sensor arrangement, for example the sensor arrangement 4, may be stored in an interim storage device 4a, which cooperates with the sensor arrangement. It is then possible to connect the sensor arrangement 4 and/or the storage device 4a in a suitable manner (galvanically) to the connecting point 9 which, to this end, is also suitably equipped in order to transmit in this way the data determined by the sensor arrangement 4 to the data processing device 7.

The non-cyclical special data points are herein characterized as such in a particular manner for example by a corresponding attribute (flag).

The data processing arrangement 7 of the apparatus 1 according to the invention includes in accordance with FIG. 1, a number of means 11.1, 11.2, 11.3, . . . preferably in the form of software for performing a method according to the invention for managing data for the purpose of the coordination as explained above of data points and reference points, the functionality of which will be explained below in greater detail. The means 11.1, 11.2, 11.3, . . . mentioned above can be implemented in any common program language, particularly in Java, wherein the corresponding program code can be provided for example via the input means 10a in a suitable form as it is well-known to the person skilled in the art.

Figure 2:
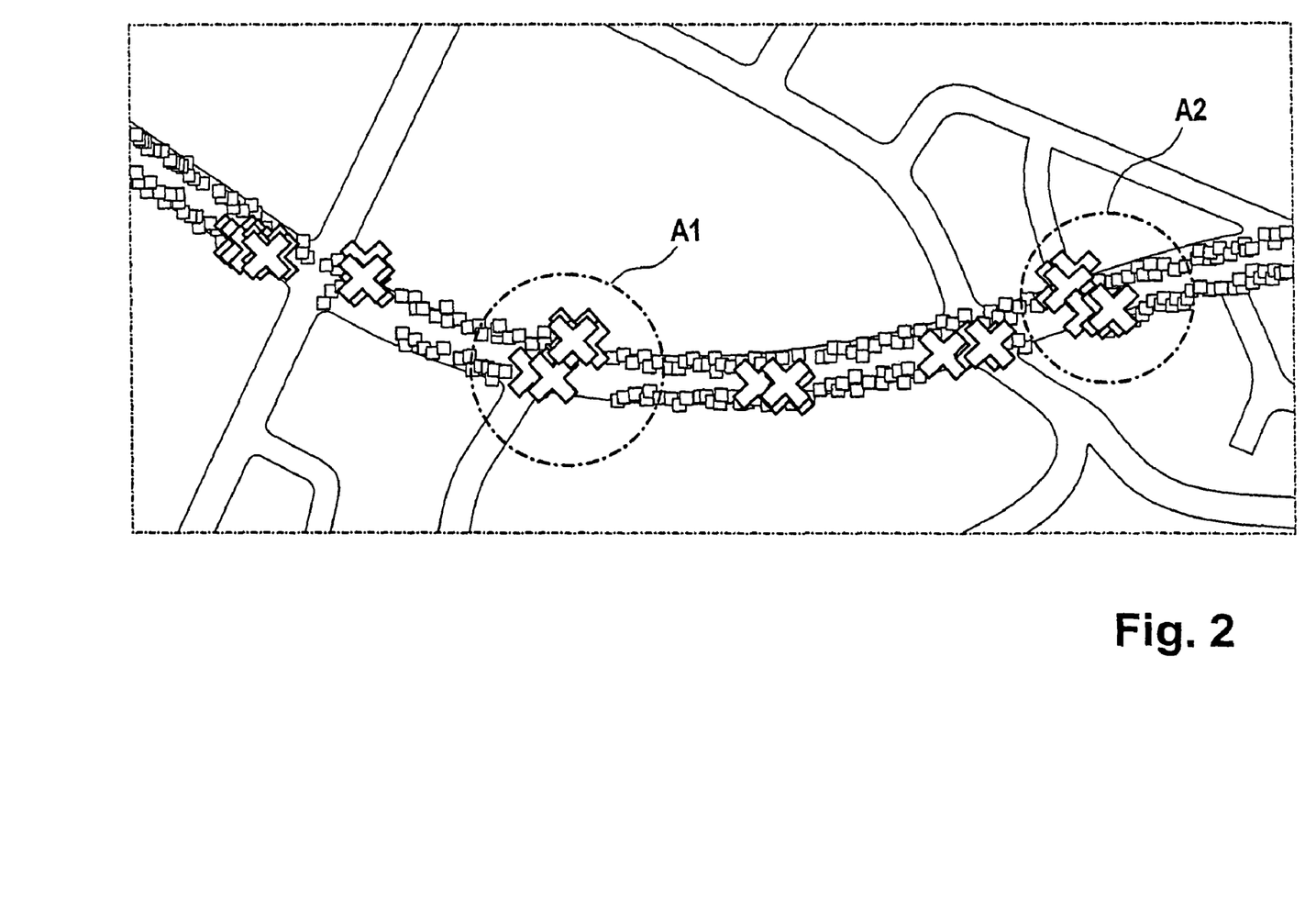
FIG. 2 a detailed representation of exemplary data to be managed by means of the apparatus according to FIG. 1, FIG. 3 a detailed representation, in sections, of the data shown in FIG. 2, FIG. 4 a performance diagram of a particular embodiment of the invention, and FIG. 5 a graphic representation of individual steps of the method according to the invention as shown in FIG. 4.

FIG. 2 shows, based on real data, in a GIS (Geographic Information System) representation, data points as determined by a device according to the invention. Shown herein is for example the use of the invention in connection with a local public passenger transport system.

The crosses in FIG. 2 symbolize particular data points as they are generated when an object (vehicle, bus) opens a door near a reference point (stop) which symbolizes a vehicle stopping process. The distribution of the data points determined in this way around the respective reference point is apparent from FIG. 2.

The smaller boxes in FIG. 2 symbolize the data points or auxiliary data points as they are determined cyclically and described earlier. They will be described in greater detail below.

The task which can be recognized from FIG. 2 now resides in assigning the data points as clearly as possible to a respective reference point which, particularly in the image sections, indicated in FIG. 2 by A1 and A2 is not trivial because of the accumulation of data points around a plurality of reference points.

Figure 3:
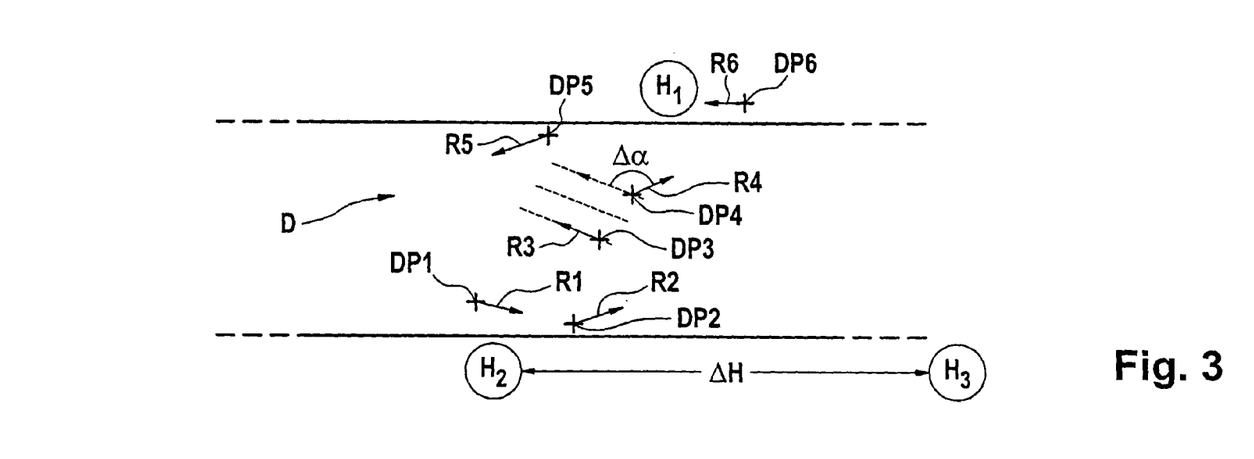

FIG. 3 shows, based on the enlarged section, for example of the area A1 in FIG. 2, the type of the data base D (corresponding to the amount of all the determined particular data points), on the basis of which the method according to the invention operates. The data points are marked in FIG. 3 by crosses ("+") and designated by DPi, i=1, 2 ... Each data point DPi is further assigned a direction Ri which results for example from a coordinate difference of the respective data point DPi and a time-wise earlier, cyclical data point (not shown in FIG. 3), which belongs to the same movement of the respective sensor arrangement (see arrows B, $B^1$ in FIG. 1). The time distance from this previous cyclic data point is herein to be so selected that the directional information Ri indicates as accurately as possible the momentary direction of movement of the object/sensor at the location of the associated data point DPi.

The reference points P1, P2 of FIG. 1 are indicated in FIG. 3 with reference to the underlying special embodiment with $H_1$-$H_3$ (stops 1 to 3). The horizontal lines in FIG. 3 symbolize opposite sides of the street on which the stops $H_1$-$H_3$ are located. In accordance therewith, the individual data points DPi are pure coordinate data, that is, to each data point corresponding (planar) GPS coordinates are assigned.

In the data point DP4 an angle $\Delta\alpha$ of the relative orientation between two movement directions, that is, in this case, the movement directions R3 in point DP3 and R4 in point DP4 is defined, the significance of which will be explained later. The relative angle $\Delta\alpha$ is advantageously so defined that $0°<\Delta\alpha<180°$.

In FIG. 3, $\Delta H$ indicates a minimum distance between two reference points (stops) which are on the same side of the street and which, therefore, are basically little different with respect to the direction of the data point assigned to them, which will be explained later.

Figure 4:
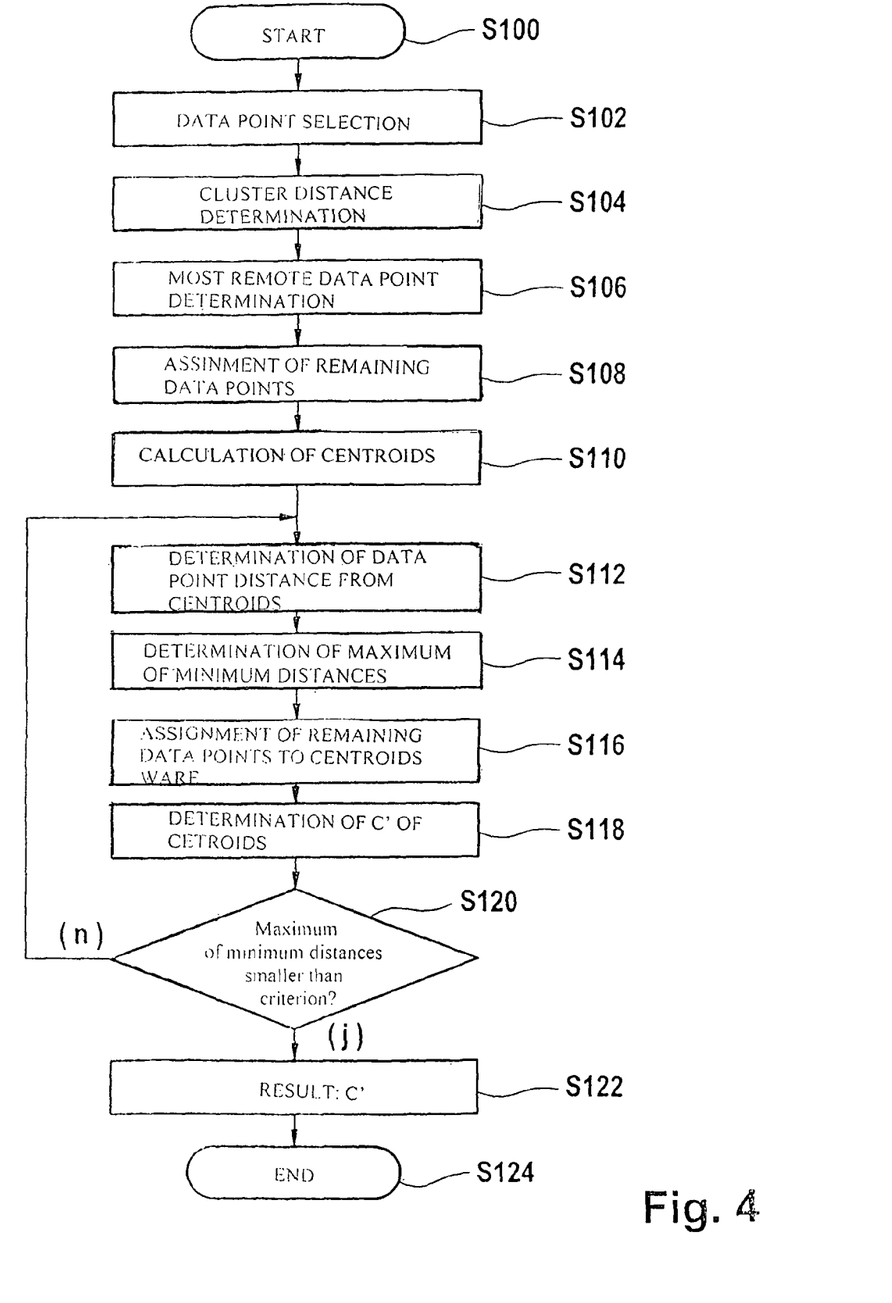

FIG. 4 shows an operating sequences diagram of an embodiment of the method according to the invention for managing data in an exemplary application in connection with the data basis D shown in FIG. 3. Herein corresponding (software) means 11.1, 11.2, 11.3 ... of the data processing device 7 as shown in FIG. 1 are assigned to the individual method steps of FIG. 4 or respectively, are provided as it is clearly obvious for the person skilled in the art so that it does not need to be explicitly specified. The aim of the method described hereafter is to determine from the data points DPi according to FIG. 3 certain groups of data points which are also called classes or clusters and which can then be assigned as clearly as possible each to a certain reference point.

In the description of FIG. 4, the clusters are designated by $C_i$. The amount of all the data points DPi is called D. Additionally, for each cluster Ci, a so-called centroid Ci is defined, which represents the geometric center point of the respective cluster Ci, The amount of all centroids is designated C'.

For the distance calculations required in the method according to the invention, different metrics may be used depending on the application. In this connection, for the person skilled in the art common metrics comprise particularly the Euclid-metric, the Manhattan-metric, the maximums-metrics and the Hamming-metric. In this connection, also, the relative orientation $\Delta\alpha$ may be used in the determination of the distance between two data points the determination of the distance between two data points DPi (see FIG. 3) for example, in the form of a weighting:

$$[\text{dist}]^2 + (\Delta x_{max}^2/\Delta\alpha_{max}^2) \times \Delta\alpha^2,$$

wherein [dist] represent the distance between two points in accordance with the metric used, $\Delta\alpha$ the relative angle in accordance with FIG. 3, $\Delta x_{max}$ the maximum admissible distance between points within a cluster and $\Delta\alpha_{max}$, the maximum admissible angle difference between points within a cluster. Specifically, as value for $\Delta x_{max}$ in accordance with FIG. 3, the following is obtained;

$$\Delta x_{max} = \Delta H/2.$$

For $\Delta\alpha_{max}$, typically a value of about 80° is assumed. The method of the invention in accordance with FIG. 4 begins at the step S100. Subsequently, in step S102 any data point, for example, data point DP1, is selected from D and entered as cluster $C_1$.

In step S104, all distances between the cluster C and all other data points are calculated from D in accordance with the selected metric—taking into consideration in particular relative orientations, as described earlier.

On the basis of the distances as calculated in step S104 then, in step 106, the data point most remote from C1, for example data point DP6, is selected and entered as cluster $C_2$. The result is the amount of all the clusters C={C1, C2}.

Subsequently, in step S108, each of the remaining data points of D are assigned, on the basis of distance, to the nearest cluster $C_i$ of C. Consequently, each cluster receives a number of data points and, consequently, can be called a group or class of data points.

In step S110 then the amount C'={$C'_1, C'_2$} of the centroids (center-points) of the newly determined classes are calculated.

In a subsequent method step S112, the distance of each data point of D from the already established centroids of C' are determined in accordance with the selected metric. For each data point, the minimum distance is stored wherefor the data processing device 7 of FIG. 1 includes a storage device which is not explicitly shown therein.

Subsequently, in step S114, the maximum of the minimum distances (one minimum distance per data point from D) is selected and this data point is used as new cluster $C_x$. The result C'={$C'_1, \ldots C'_m, C_x$} could strictly not be designated as the centroid since it represents only one data point, which, however, coincides with the center-point of the cluster which contains only this data point.

Then, in step S116 each remaining data point of D is assigned to the closest centroid of C'. Herein, like before, the "distance-based assignment" means that all coordinate distances that can be considered are determined on the basis of the selected metric and are accordingly compared with one another, to which end the data processing device 7 of the apparatus 1 according to the invention as shown in FIG. 1 is appropriately designed as noted.

Then, in step S118, the amount C'={$C'_1, \ldots C'_{m+1}$} of the centroids are calculated for the newly determined clusters (classes, groups).

Following the step S118, in a step S120, an interrogation is performed as to whether the maximum selected of the found minimum distances (which is also called "maximin") in step S114 is smaller than a predetermined termination criterion, that is, a predetermined termination distance. This corresponds for example to the predetermined distance $\Delta x_{max}$ referred to earlier. In this way, it is to be ensured that no data point within a cluster is spaced further from the cluster center point than would be acceptable with respect to a reference point (see FIG. 1, 3).

If the interrogation in step S120 is answered yes (j), in a subsequent step S122, the amount C' is provided as the direct result of the method wherein each centroid of C' can be assigned to a predetermined reference point wherein the assignment can be established automatically within the data processing device 7 according to FIG. 1 or in particular by visual matching by an operator of the data processing arrangement.

Herein, particularly the input and output means 10a, 10b of the data processing device 7 shown in FIG. 1 can be employed.

The method according to the invention subsequently ends in step S124.

If however, the interrogation in step S120 is answered negatively (n), the method according to the invention returns to step 112 and repeats the step sequence S112 to S118 until in step S120 the termination criterion is determined.

FIG. 5 shows again schematically the partial steps of the method according to the invention as explained earlier in connection with FIG. 4.

Figure 5:
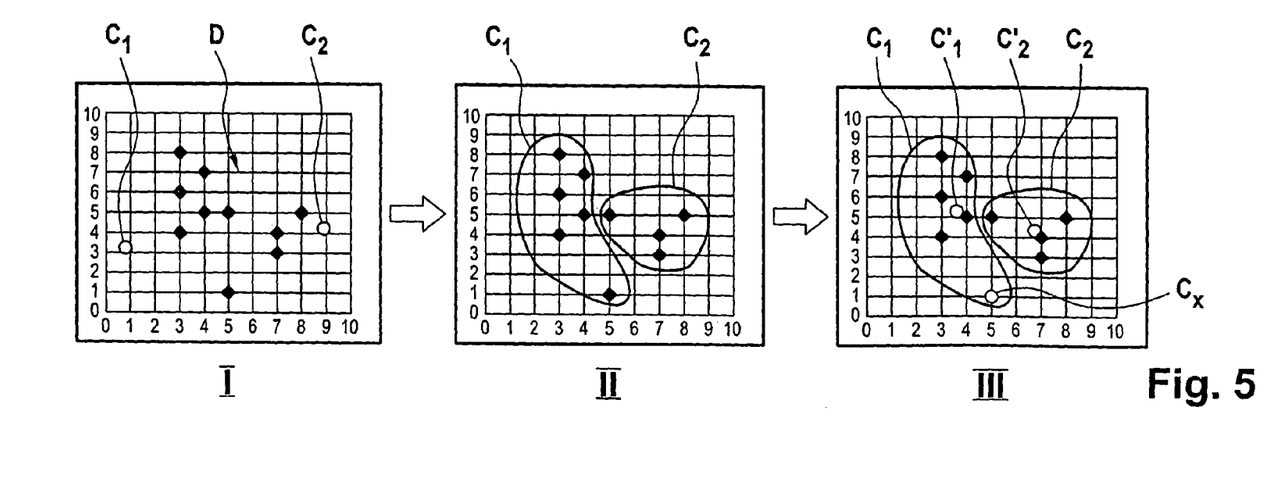

In the left hand partial image (I) of FIG. 5, on a coordinate lattice with any type of units, an amount D of data points (squares) is shown. Two individual objects (round) which correspond to the previous, preferably two additional maximally spaced data points, are selected as initialization clusters $C_1 C_2$.

Subsequently, the individual data points are grouped based on distances, with respect to the nearest starting point, which is indicated in the intermediate representation II of FIG. 5 by the closed lines. Since the initialization cluster $C_1$, $C_2$ in the left representation I of FIG. 5 are only virtual objects (no actual data points) they are not again shown in the intermediate representation II of FIG. 5. However, the method works principally in an analog way if two real data points are selected in the representation I.

Subsequently, (right presentation III of FIG. 5), the centroids $C'_1$, $C'_2$ for each cluster $C_1$, $C_2$ are calculated so that then, as described above on the basis of FIG. 4, a distance determination of the data points with respect to the centroids $C'_1, C'_2$ can be performed in order to iteratively determine new cluster starting points from the amount D of data points.

In the case of FIG. 5 (representation III), the data point arranged near the coordinates (5.1) has obviously the largest (maximum) minimal distance from one of the centroids $C'_1$, $C'_2$, so that, in accordance with the invention, this data point is available as additional reference point (cluster $C_x$) for an assignment of the data points of D. In other words, the data points of D are assigned, following the step shown in the right representation III of FIG. 5, in a next step, depending on the distance either from the centroid $C'_1$, the centroid $C_2$ or the newly selected data point at (5/1), that is, to the additional cluster $C_x$. On the basis of this arrangement then new centroids (now three) are calculated and possibly a new cluster starting point is determined until the termination criterion is reached.

In this way, it is possible in accordance with the invention to manage data or respectively data points which are gathered during normal operation of the apparatus 1 in such a way that a safe and clear coordination of data points to the predetermined reference points is possible. If the data points are pure coordinate data as for example in connection with the preferred use of the invention in the field of public passenger transport systems, the actual positions of the predetermined reference points can be safely determined in this way. If the invention is used in different technical areas, depending on the design of the sensor devices used, other operating parameters (pressure temperature or similar values) can be determined at the actual positions, for example, by forming average values or in the form of time-dependent values. The present invention facilitates therefore particularly the continuous surveillance of (operating) parameters without additional time consuming and expensive use of personnel and operating means.

What is claimed is:

1. A method for operating mass transportation systems wherein coordinates of position reference points (P1, P2, $H_1$, $H_2$, $H_3$) of desired stops of mass transit vehicles are monitored and data points (DPi) are determined with a spatial distribution around respective reference position points using at least one coordinate determination arrangement (14, 15), said method comprising the steps of:
   a) grouping the data points (DPi) into a number of data point classes ($C_i$) in accordance with a first distance criterion around a desired reference position point;
   b) determining for each data point class ($c_i$) a center point ($C'_i$);
   c) comparing a distance of each data point ($DP_i$) from the center-point of the data point classes ($C_i$) with a second distance criterion; and
   d) depending on the comparison:
      d1) selecting a data point as a starting point of an additional data point class ($C_x$);
      d2) re-grouping the data points Bpi into established data point classes ($C_1$, $C_2$) and an additional data point class ($C_x$) in accordance with the first distance criterion,
      d3) repeating the steps b) to d2) until a predetermined termination criterion is fulfilled, and
   e) assigning the various data point classes to a respective reference point indicating a adjusted desired vehicle stop position.

2. The method according to claim 1, wherein, in step a) a number of data points (DP1, DP6) is selected and, subsequently, the remaining data points are assigned, in their classes, each to that data point from which they have the smallest distance.

3. The method according to claim 1, wherein, in a step a), as starting point for in each case one class, any data point is selected as a first data point (DP1) and a second data point (DP6) is selected which has a maximum distance from the first data point.

4. The method according to claim 1, wherein the second distance criterion in step c) is predetermined depending on a minimum distance ($\Delta H$) between individual reference points ($H_1$, $H_2$, $H_3$).

5. The method according to claim 1, wherein, in step d1) the data point (DPi) is selected whose smallest distance from its center, point ($C'_i$) as determined in step c) is the maximum with respect to all data points (D) taken into consideration.

6. The method according to claim 1, wherein, in steps a) and d2), the data points (DPi) are assigned to those data point classes ($C_1$, $C_2$) or the additional data class ($C_x$) from whose center-point or, respectively, starting point they have the smallest distance.

7. The method according to claim 1, wherein step d3) is executed until all, distances determined in step c) are smaller than, or equal, half a minimum distance ($\Delta H/2$) between individual reference points (P1, P2, $H_1$, $H_2$, $H_3$).

8. The method according to claim 1, wherein each data point (DPi) includes a direction information concerning an orientation of the movement (B, B') of the respective sensor arrangement (4, 5) during the data point determination and the distance and/or center point determinations are performed by weighting spatial coordinate differences between data points (DPi) with relative orientations ($\Delta\alpha$).

9. The method according to claim 8, wherein, for determining the orientation within a predetermined time window, a plurality of auxiliary data points are determined for each data point (DPi).

10. The method according to claim 8, wherein the weighting is stronger the less spatially spaced the data points are.

11. The method according to claim 8, wherein only data points (DPi) with a relative orientation ($\Delta\alpha$) within a predetermined tolerance interval ($\Delta\alpha_{max}$) are assigned to a common data point class ($C_i$).

12. An arrangement (1) for determining coordinate data (D), with at least one coordinate determining sensor arrangement (4, 5) which is movable spatially at least in the vicinity of predetermined reference points (P1, P2) for the determination of data points (DPi) with reference to the predetermined reference points, said arrangement comprising:

a data processing device (7) into which the data points (DPi) from the sensor arrangement (4, 5) can be entered and which includes means (11.1, 11.2, 11.3 . . . ) for performing a method for managing coordinate data (D), which are determined with reference to a predetermined number of reference points (P1, P2, $H_1$, $H_2$, $H_3$) as data points (DPi) with a spatial distribution around the respective reference points, and means for establishing from the various data points desired vehicle stop positions.

13. The arrangement according to claim 12, wherein the sensor arrangement (4, 5) is designed for determining direction information (Ri) concerning en orientation of the movement (B, B') of the sensor arrangement (4, 5) during the data point determination, and that the data processing device (7) being capable of performing a method for managing data in which each data point (DPi) includes a direction information concerning an orientation of the movement (B, B') of the respective sensor arrangement (4, 5) during the data point determination and at least one of the distance and the center point determinations being performed by weighting spatial coordinate differences between data points (DPi) with relative orientations ($\Delta\alpha$).

14. The arrangement according to claim 12, wherein the sensor arrangement (4, 5) is assigned to an object (2, 3) with an application purpose which is independent of the data point determination.

15. The arrangement according to claim 14, wherein the sensor arrangement (4, 5) is designed for a data point determination dependent on at least one predetermined change of state of the object (2, 3).

16. A non-transitory computer program product, comprising first program code sequences for reading coordinate data (D), which are determined with respect to a number of predetermined reference points (P1, P2) in the form of data points (DPi) with a spatial distribution around the respective reference point using at least one coordinate determination arrangement, into a data processing apparatus, comprising second program code sequences for executing the additional data processing steps of the method according to claim 1.

* * * * *